(12) United States Patent
Nakano

(10) Patent No.: US 7,168,771 B2
(45) Date of Patent: Jan. 30, 2007

(54) METHODS OF MEASURING PRESSURE OF HYDRAULIC FLUID, METHODS OF EVALUATING SOUNDNESS AND HYDRAULIC DRIVE DEVICES FOR CARRYING OUT THE METHODS

(75) Inventor: Keita Nakano, Aichi-ken (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 11/071,153

(22) Filed: Mar. 4, 2005

(65) Prior Publication Data

US 2005/0146211 A1 Jul. 7, 2005

Related U.S. Application Data

(62) Division of application No. 10/410,295, filed on Apr. 10, 2003, now Pat. No. 6,938,471.

(30) Foreign Application Priority Data

Apr. 10, 2002 (JP) ............................. 2002-108160

(51) Int. Cl.
*B60T 13/16* (2006.01)
(52) U.S. Cl. ............. 303/191; 303/122.11; 303/122.14
(58) Field of Classification Search ................ 303/191, 303/155, 122.13, 122.14, 122.11; 73/168
See application file for complete search history.

(56) References Cited

U.S. PATENT DOCUMENTS

| | | | |
|---|---|---|---|
| 2,926,965 A | 3/1960 | Wilson et al. | |
| 4,538,228 A | 8/1985 | Brearey et al. | |
| 4,807,945 A | 2/1989 | Budecker et al. | |
| 4,811,252 A | 3/1989 | Furuse | |
| 5,127,712 A | 7/1992 | Rizk et al. | |
| 5,221,125 A * | 6/1993 | Okochi et al. | ................ 303/10 |
| 5,462,343 A | 10/1995 | Yoshida et al. | |
| 6,126,248 A | 10/2000 | Kawahata et al. | |
| RE37,151 E | 5/2001 | LaFountain | |
| 6,247,765 B1 | 6/2001 | Oyama | |
| 6,679,569 B2 * | 1/2004 | Schmidt et al. | ........ 303/122.12 |
| 6,729,698 B2 * | 5/2004 | Kusano et al. | ............. 303/191 |
| 6,927,681 B2 * | 8/2005 | Yoshino et al. | ............. 340/452 |

FOREIGN PATENT DOCUMENTS

JP        63-46959 A        2/1988

* cited by examiner

*Primary Examiner*—James McClellan
*Assistant Examiner*—Bradley T. King
(74) *Attorney, Agent, or Firm*—Buchanan Ingersoll & Rooney PC

(57) ABSTRACT

A condition of hydraulic fluid conducted from an accumulator to an operation device via a pressure control unit, is evaluated by determining a pressure (Pa) of the fluid in a flow path interconnecting the accumulator and the control unit, and determining a stabilization time (T) when an absolute value of a pressure gradient per unit time of the pressure falls below a predetermined value. A pressure drop ($\Delta Pa$) of the pressure is determined during a period between a time (T0) when the pressure begins to decrease, or at a time before the time (T0) and the stabilization time (T). The pressure drop is compared with a predetermined pressure drop that is obtainable under normal conditions. An increase in ($\Delta Pa$) can signify the entry of air into the hydraulic fluid, or a leakage of the hydraulic fluid.

13 Claims, 5 Drawing Sheets

METHODS OF MEASURING PRESSURE OF HYDRAULIC FLUID, METHODS OF EVALUATING SOUNDNESS AND HYDRAULIC DRIVE DEVICES FOR CARRYING OUT THE METHODS

This application is a divisional of U.S. application Ser. No. 10/410,295 filed on Apr. 10, 2003 now U.S. Pat. No. 6,938,471.

This application claims priority to Japanese patent application Ser. No. 2002-108160, the contents of which are incorporated herein by reference.

BACKGROUND OF THE INVENTION

1. Field of the Invention

The present invention relates to methods of measuring pressure of hydraulic fluid within hydraulic drive devices, e.g., brake devices and power steering devices of vehicles. In particular, the present invention relates to methods of measuring a pressure of a fluid that is supplied from the hydraulic drive device to an operation device, e.g. wheel brakes. The present invention also relates to methods of evaluating the condition of the hydraulic fluid within the hydraulic drive device in terms of soundness. For example, such soundness may include entrance of air into a flow path(s) of the hydraulic drive device. Furthermore, the present invention relates to hydraulic drive devices for carrying out these methods.

2. Description of the Related Art

Brake devices are known that include a pump for pressuring a brake fluid, an accumulator for accumulating the pressure of the pressurized brake fluid, and a pressure control unit, e.g., a hydraulic booster, that receives a supply of the pressurized hydraulic fluid from the accumulator. The hydraulic booster includes a pressure control valve for adjusting the pressure of the pressurized hydraulic fluid supplied from the accumulator in response to a stepping force applied to a brake pedal by a driver of a vehicle. The pressurized hydraulic fluid having the adjusted pressure is then delivered to wheel brakes.

In recent years, multifunctional brake devices, e.g., automatic brake devices, have been proposed. In general, such multifunctional brake devices require measurement of the pressure of the brake fluid in order to perform necessary function(s). In addition, when air has entered the flow path of the brake device or when the brake fluid within the flow path has leaked from the flow path, e.g., a pipeline(s), such troubles may influence on the control force(s) applied to the wheel brakes. However, the recognition of such troubles has been relied upon change in operation feeling of the driver who steps on the brake pedal. Therefore, there has been a potential demand for enabling evaluation of soundness that may be caused by the troubles mentioned above.

However, in general, wheel brakes are located away from a pressure control unit (e.g., a hydraulic booster). Therefore, pipelines that connect the pressure control unit and the wheel brakes must have relatively long length(s). In addition, in recent years, brake devices that are equipped with electronic control systems, e.g., anti lock brake control systems (ABS), have been increased. The brake devices that are equipped with such electronic control systems generally have pressure regulators. The pressure regulator includes a plurality of solenoid valves in order to control or regulate the pressure of the brake fluid that is supplied to each wheel brake. Naturally, the solenoid valves have orifices that may produce resistances against the flow of the brake fluid. Therefore, in some cases, the pressure may not be rapidly transmitted from the pressure control unit to the wheel brakes. In other words, the transmission of pressure may be delayed. In particular, such delay of transmission of pressure tends to be caused when a driver of a vehicle has abruptly stepped on a brake pedal or when the environmental temperature is relatively low.

If the delay of transmission of pressure has been caused between the pressure control unit and the wheel brakes, the pressure of the brake fluid within the pipelines as well as the pressure within the pressure control unit and the pressure within the wheel brakes may not be uniformly distributed along the length of the pipelines. Therefore, in some cases, a pressure detected by a sensor disposed in a portion of the pipelines is different from a pressure of the brake fluid that is actually supplied to the wheel brakes. As a countermeasure for avoiding such discrepancy, the measurement of the pressure may be made after the pressure distribution has become uniform. However, this countermeasure requires to wait for a long time that is sufficient for stabilization of the pressure distribution, because no measure has been known in order to predict when the pressure distribution becomes uniform. As a result, the measurement of the actual pressure supplied to the wheel brakes has consumed much time.

Incidentally, methods are known that utilize the result of detection of the pressure of the brake fluid in order to evaluate soundness of the brake devices. For example, the detected pressure may be used for ensuring that no air has entered the brake fluid within the pipelines. However, there have been increased demands for improved evaluation methods that utilize a rational process in order to enable rapid and reliable evaluation.

SUMMARY OF THE INVENTION

It is accordingly an object of the present invention to teach improved techniques for rationally measuring a pressure of a fluid that is supplied from a pressure control unit of a hydraulic drive device to an operation device.

According to one aspect of the present teachings, methods of measuring a pressure of a hydraulic fluid supplied from a hydraulic drive device to an operation device are taught. For example, the control device may be a brake device and the operation device may be a wheel brake(s). The methods may comprise the following steps:

(1) Measuring a first pressure (Pm) of the hydraulic fluid within a first flow path connecting a pressure control unit and an operation device.

(2) Measuring a second pressure (Pa) of the hydraulic fluid within a second flow path connecting an accumulator and the pressure control unit.

(3) Determining a stabilization time (T) that is the time when an absolute value of a pressure gradient per unit time of the second pressure (Pa) becomes smaller than a predetermined value.

(4) Determining a third pressure (Pw) of the hydraulic fluid supplied to the operation device based on the first pressure that is measured at the stabilization time (T) or at a time immediately after the stabilization time (T).

Therefore, the third pressure (Pw) of the hydraulic fluid supplied to the operation device can be determined based on the fist pressure. In addition, the measurement can be performed as soon as the third pressure (Pw) has become stabilized or steady. Here, the stabilization time is the time when an absolute value of a pressure gradient per unit time of the second pressure becomes smaller than a predetermined value. In other words, the stabilization time may be the time when the second pressure has become uniform or when the change of pressure with time is relatively small.

Various experimental results have indicated that when the second pressure (Pa) becomes in stable or steady, the third pressure (Pw) as well as the second pressure (Pm) also become in stable or steady. In addition, after the stabilization time, the second pressure (Pm) and the third pressure (Pw) become substantially equal to each other. Otherwise, the third pressure (Pw) may be calculated by multiplying the measured value of the second pressure (Pm) by a correction coefficient. Therefore, the second pressure (Pm) can be reliably and quickly determined.

In another aspect of the present teachings, methods of evaluating a condition of a hydraulic fluid supplied from a hydraulic drive device to an operation device are taught. The evaluating methods may include the same steps as the measuring methods or may utilize some of the steps of the measuring methods.

Thus, the evaluating methods may include the following steps (1) to (4):
(1) Measuring a pressure (Pa) of the hydraulic fluid within a flow path connecting the accumulator and the pressure control unit.
(2) Determining a stabilization time (T) that is the time when an absolute value of a pressure gradient per unit time of the pressure (Pa) becomes smaller than a predetermined value.
(3) Determining a pressure drop (ΔPa) of the pressure (Pa) during a period between a time (T0) when the pressure (Pa) begins to decrease or at a time before the time (T0) and the stabilization time (T).
(4) Comparing the determined pressure drop (ΔPa) of the pressure (Pa) with a predetermined pressure drop to be obtained under a normal condition.

Thus, the pressure drop (ΔPa) may be influenced by the condition of the hydraulic fluid within the flow path. For example, the pressure drop (ΔPa) may be increased if air has entered into pipelines of the hydraulic drive device. The pressure drop (ΔPa) also may be increased if the hydraulic fluid has leaked from the pipelines to the outside.

Therefore, it is possible to determine whether or not air has entered the pipelines (or the hydraulic fluid has leaked) by comparing the determined pressure drop (ΔPa) with a predetermined pressure drop to be obtained under a normal condition, where no air has entered the pipelines and no hydraulic fluid has leaked from the pipelines. Thus, if the determined pressure drop is greater than the predetermined pressure drop, the recognition can be made that the air has entered the pipelines or the hydraulic fluid has leaked from the pipelines. The predetermined pressure drop can be easily determined, e.g., from experimental results.

In another aspect of the present teachings, the evaluating methods may further include the step of determining a pressure (Pw) supplied to the operation device to be substantially equal to the pressure (Pm) measured at the stabilization time (T) or at a time immediately after the stabilization.

In another aspect of the present teachings, hydraulic drive devices are taught that may include a first pressure sensor and a second pressure sensor. The first pressure sensor may detect the pressure (Pm). The second pressure sensor may detect the pressure (Pa). An operation control unit may determine the stabilization time (T) and the pressure (Pw).

Therefore, the pressure (Pw) of the hydraulic fluid supplied to the operation device can be determined based on the pressure (Pa) that is detected by the first pressure sensor. In addition, the measurement of the pressure (Pw) can be performed as soon as the pressure (Pw) has stabilized or has become steady. Therefore, the pressure (Pm) can be reliably and quickly determined by the operation control unit.

According to another aspect of the present teachings, the control unit may serve to determine the pressure drop (ΔPa) of the pressure (Pa) and to compare the determined pressure drop with a predetermined pressure drop to be obtained under a normal condition.

Preferably, the operation control unit may include a CPU that stores a program for performing the determination and comparison operations as described above.

BRIEF DESCRIPTION OF THE DRAWINGS

Additional objects, features and advantages of the present invention will be readily understood after reading the following detailed description together with the claims and the accompanying drawings, in which:

DETAILED DESCRIPTION OF THE INVENTION

Figure 1:
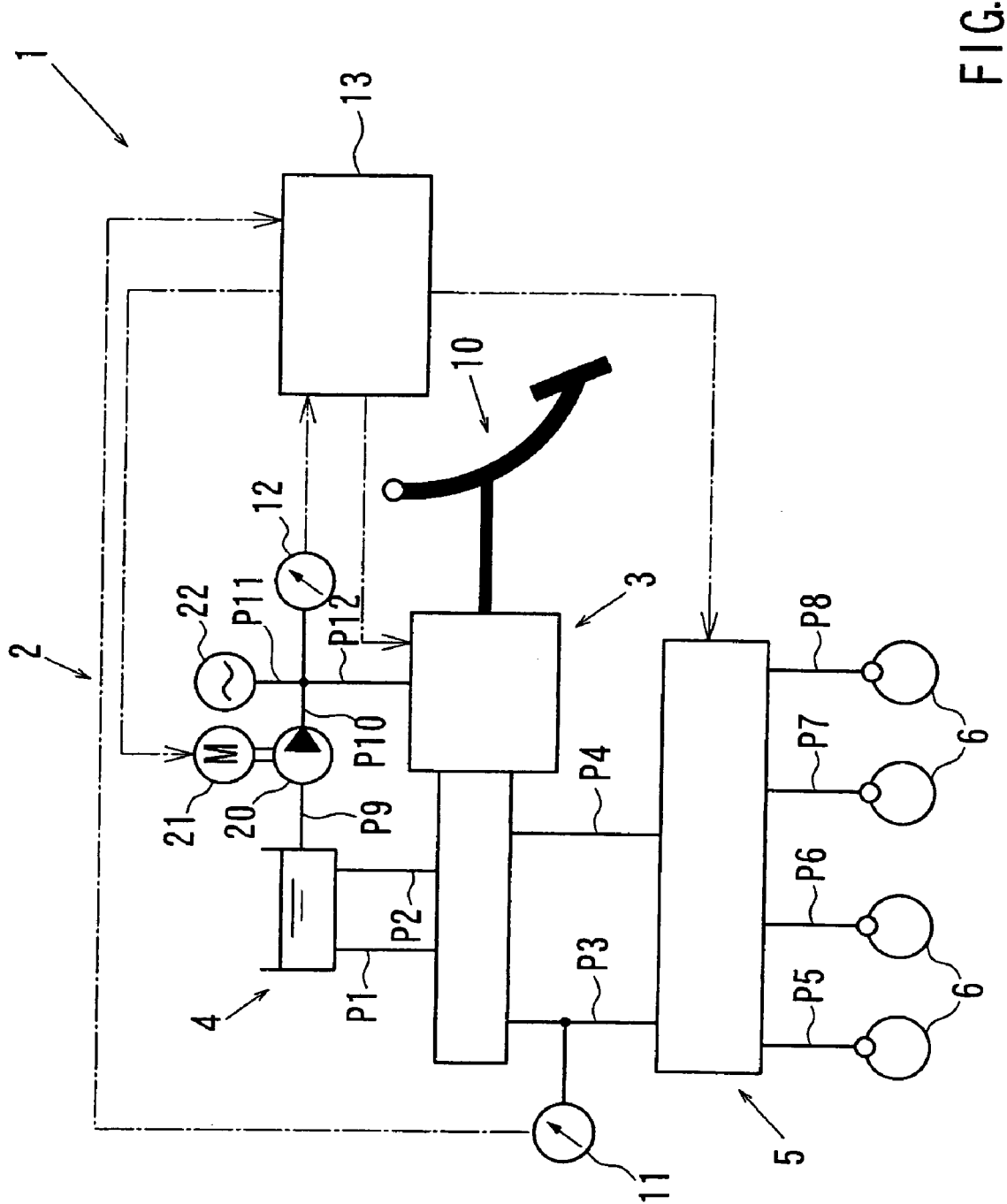
FIG. 1 is a schematic diagram showing various elements of a representative brake device and showing various pipelines and electric lines of the brake device.

In one embodiment of the present teachings, methods of measuring a pressure of a hydraulic fluid are taught. The methods may include the following steps (1) to (4):
(1) Detecting a first pressure of the hydraulic fluid within a pipeline by a first pressure sensor. The pipeline may be connected between an operation device and a pressure control unit of a hydraulic drive device and the first pressure sensor may be coupled to the pipeline. For example, the operation device may be a wheel brake(s) of a vehicle, e.g., an automobile. The hydraulic drive device may be a brake device, and the hydraulic pressure control unit may be a hydraulic booster.
(2) Detecting a second pressure of the hydraulic fluid within a pressure-variable accumulator by a second pressure sensor. The accumulator may receive the supply of the pressurized hydraulic fluid from a hydraulic pressure generator, e.g., a pump. The second pressure sensor may be coupled to the accumulator.
(3) Determining a stabilization time by an operation control unit. The stabilization time may be a time when an absolute value of a pressure gradient per unit time of the pressurized hydraulic fluid supplied from the accumulator becomes smaller than a predetermined value during the supply of the pressurized hydraulic fluid from the pressure control unit to the operation device. The operation control unit may receive detection signals from the first and second pressure sensors.
(4) Determining a pressure of the hydraulic fluid supplied to the operation device based on the first pressure detected by the first pressure sensor at the stabilization time or at a time immediately after the stabilization time.

Therefore, even on the condition that the pressure of the hydraulic fluid may not uniformly distribute along a flow path for some reason or other, e.g., due to delay in transmission of pressure, the time when the pressure distribution becomes uniform can be rapidly determined, so that the pressure of the hydraulic fluid supplied to the operation device can be rationally measured or determined.

Thus, in response to input from the external device, e.g., a stepping force or a stepping amount of a brake pedal, the pressure control unit may control or regulate the pressure of the pressurized hydraulic fluid accumulated within the accumulator and may then supply the regulated hydraulic fluid to the operation device. In addition, as the hydraulic pressure control unit supplies the regulated hydraulic fluid to the operation device, the pressure within the accumulator may be reduced. The stabilization time may be determined to be the time when the pressure gradient per unit time (absolute value) of the fluid within the accumulator has become less than a predetermined value, e.g., zero or nearly zero.

At the stabilization time or after the stabilization time, the delay of transmission of pressure may be minimized even on the condition that the delay is inevitable. In addition, the pressure of the hydraulic fluid within the flow path may become substantially uniform along the length of the flow path or may have a substantially fixed distribution.

Thus, the pressure accumulated within the accumulator may be consumed when the hydraulic pressure control unit supplies the pressurized hydraulic fluid to the operation device in response to the input of the external device. The flow rate (or the quantity of flow) of the hydraulic fluid discharged from the accumulator may have a close relationship with the flow rate (or the quantity of flow) that is required for increasing the pressure of the hydraulic fluid that is supplied to the operation device. Therefore, when the hydraulic fluid that has a pressure regulated in response to the input of the external device is supplied to the operation device, the flow rate of the pressurized hydraulic fluid supplied from the accumulator may be reduced.

For this reason, even on the condition that the pressure of the hydraulic fluid may not be uniformly distributed along the flow path, the pressure of the hydraulic fluid that is supplied to the operation device can be accurately determined based on the pressure of the hydraulic fluid within the pipeline(s), which pressure is measured at the stabilization time according to the present teachings.

In addition, the stabilization time may be the time when the pressure within the pipeline(s) becomes to have a uniform distribution or a predetermined distribution. Therefore, the pressure at the operation device can be determined earlier than the determination of the pressure after a sufficient time for waiting the stabilization or the steady state.

The input of the external device may be a mechanical input, e.g., the stepping force applied to the brake pedal and the amount of the stepping operation of the brake pedal. Otherwise, the input may be an electrical input, e.g. an electric signal, supplied from the operation control unit.

In another embodiment of the present teachings, the determination of the pressure of the hydraulic fluid that is supplied to the operation device may be performed when the pressure generator is not operated.

According to this embodiment, the determination of the stabilization time may be made by measuring the pressure gradient per unit time when the flow rate of the pressurized hydraulic fluid discharged from the accumulator is not influenced by the flow rate of the pressurized hydraulic fluid discharged from the pressure generator. Therefore, it is possible to avoid incorrect detection of the stabilization time. Such incorrect detection may result when the pressure gradient of the pressurized hydraulic fluid within the accumulator has reached to a predetermined value, e.g., zero, due to influence of the flow rate of the fluid supplied from the pressure generator, irrespective of the non-uniform distribution of the pressure along the pipeline(s). As a result, the accuracy of the measurement of the pressure of the hydraulic fluid can be improved.

In another embodiment of the present teachings, the methods may further include a step of resting the pressure generator in a non-operative state during the determination of the pressure of the hydraulic fluid supplied to the operation device.

According to this embodiment, the pressure generator will not operate during the determination of the pressure, even if the pressure generator is required to operate. Therefore, it is possible to avoid incorrect detection of the stabilization time for the same reason as the above embodiment. As a result, the accuracy of the measurement of the pressure of the hydraulic fluid can be improved. In addition, the frequency of measurement of the pressure can be increased, because the measurement can be made in preference to the operation of the pressure generator.

In another aspect of the present teachings, methods of evaluating soundness of a hydraulic drive device are taught. The methods may include the following steps (1) to (6):

(1) Detecting a first pressure of the hydraulic fluid within a pipeline by a first pressure sensor. pipeline may be connected between an operation member and a pressure control unit of the hydraulic drive device. The first pressure sensor may be coupled to the pipeline. For example, The hydraulic drive device may be a brake device of a vehicle, e.g., an automobile. The hydraulic pressure control unit may be a hydraulic booster. The operation device may be a wheel brake(s)

(2) Detecting a second pressure of the hydraulic fluid within a pressure-variable accumulator by a second pressure sensor. The accumulator may receive the supply of the pressurized hydraulic fluid from a hydraulic pressure generator, e.g., a pump. The second pressure sensor may be coupled to the accumulator.

(3) Determining a stabilization time by an operation control unit. The stabilization time may be a time when an absolute value of a pressure gradient per unit time of the pressurized hydraulic fluid supplied from the accumulate becomes smaller than a predetermined value during the supply of the pressurized hydraulic fluid from the hydraulic control unit to the operation device. The operation control unit may receive detection signals from the first and second pressure sensors.

(4) Determining a pressure drop in the second pressure from a time prior to starting the operation of the hydraulic pressure control unit to the stabilization time.

(5) Determining the first pressure at the stabilization time or at a time immediately after the stabilization time.

(6) Comparing the determined pressure drop with a pressure drop under a normal condition and/or comparing the detected first pressure at the stabilization time (or at a time immediately after the stabilization time) with a value of the first pressure obtained under a normal condition.

Therefore, the evaluation of the soundness of the hydraulic drive device can be rationally performed.

Thus, in response to input from the external device, e.g., a stepping force or a stepping amount of a brake pedal, the hydraulic pressure control unit may control or regulate the pressure of the hydraulic fluid accumulated within the accumulator and may then supply the regulated hydraulic fluid to the control device. In addition, as the hydraulic pressure control unit supplies the regulated hydraulic fluid to the operation device, the pressure within the accumulator may be reduced. The stabilization time may be determined to be the time when the pressure gradient per unit time (absolute value) of the fluid within the accumulator becomes less than a predetermined value, e.g., zero or nearly zero.

At the stabilization time or after the stabilization time, the delay of transmission of pressure may be minimized even on the condition that the delay is inevitable. In addition, the pressure of the hydraulic fluid within the flow path may become substantially uniform along the length of the flow path or may have a substantially fixed distribution.

Thus, the pressure accumulated within the accumulator may be consumed when the pressure control unit supplies the pressurized hydraulic fluid to the operation device in response to the input of the external device. The flow rate (or the quantity of flow) of the hydraulic fluid discharged from the accumulator may have a close relationship with the flow rate (or the quantity of flow) that is required for increasing the pressure of the hydraulic fluid that is supplied to the operation device. Therefore, when the hydraulic fluid that has a pressure regulated in response to the input of the external device is supplied to the operation device, the flow rate of the pressurized hydraulic fluid supplied from the accumulator may be reduced.

For this reason, even on the condition that the pressure of the hydraulic fluid may not be uniformly distributed along the flow path, the pressure of the hydraulic fluid supplied to the control device can be accurately determined based on the pressure of the hydraulic fluid within the pipeline(s), which pressure is measured at the stabilization time according to the present teachings. Then, the evaluation of the hydraulic drive device can be performed based on the determined pressure. Therefore, the accuracy of the evaluation can be improved.

The methods according to the present teachings may be used for determining whether or not air has entered the hydraulic fluid and for determining whether or not the hydraulic fluid has leaked from the pipeline(s). When air has entered into the hydraulic fluid or when leakage of the hydraulic fluid has occurred, the flow rate (or the quantity of flow) of the hydraulic fluid discharged from the accumulator may be increased in order to ensure the predetermined pressure within the pipelines. As a result, the pressure drop may be increased. Therefore, the evaluation can be made by comparing the determined pressure drop with a pressure drop under a normal condition and/or by comparing the determined first pressure at the stabilization time (or immediately after the stabilization time) with a value under normal condition of the first pressure at stabilization time.

The input of the external device may be a mechanical input, e.g., the stepping force applied to the brake pedal and the amount of the stepping operation of the brake pedal. Otherwise, the input may be an electrical input, e.g. an electric signal, supplied from the operation control unit.

In another embodiment of the present teachings, the evaluation may be performed when the pressure generator is not operated.

According to this embodiment, the determination of the stabilization time may be made by measuring the pressure gradient per unit time when the flow rate of the pressurized hydraulic fluid discharged from the accumulator is not influenced by the flow rate of the pressurized hydraulic fluid discharged from the pressure generator. Therefore, it is possible to avoid incorrect detection of the stabilization time. Such incorrect detection may result when the pressure gradient of the pressurized hydraulic fluid within the accumulator has reached to a predetermined value, e.g., zero, due to influence of the flow rate of the fluid supplied from the pressure generator, irrespective of the non-uniform distribution of the pressure along the pipeline(s). As a result, the accuracy of the measurement of the evaluation can be improved.

In another embodiment of the present teachings, the methods may further including a step of resting the pressure generator in a non-operative state during the evaluation.

According to this embodiment, the pressure generator will not operate during the determination of the pressure, even if the pressure generator is required to operate. Therefore, it is possible to avoid incorrect detection of the stabilization time for the same reason as the above embodiment. As a result, the accuracy of the evaluation of soundness can be improved. In addition, the frequency of evaluation can be increased, because the evaluation can be made in preference to the operation of the pressure generator.

In another embodiment of the present teachings, hydraulic drive devices are taught that may include a control unit that is operable to perform the various methods steps as described above, so that the measurement and the evaluation can be automatically performed.

Each of the additional features and teachings disclosed above and below may be utilized separately or in conjunction with other features and teachings to provide improved measuring and evaluating methods and hydraulic drive devices. Representative examples of the present invention, which examples utilize many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A representative hydraulic drive device will now be described with reference to FIGS. 1 to 4. Referring to FIG. 1, a brake device 1 as a representative drive device may be mounted on a vehicle, e.g., an automobile (not shown), and may include a brake pedal 10 and a plurality of wheel brakes 6. The brake device 1 also may include a reservoir tank 4, a pressure source 2, a hydraulic booster 3, a pressure adjusting unit 5 and an operation control unit 13.

As shown in FIG. 1, the pressure source 2 may include a pump 20 and an accumulator 22. The pump 20 may be driven by a motor 21.

The pump 20 may be connected to the reservoir tank 4 via a pipeline P9. The pump 20 also may be connected to the accumulator 22 via pipelines P10 and P11. Therefore, a brake fluid or a hydraulic fluid within the reservoir tank 4 may be drawn into the pump 20 so as to be pressurized. The pressurized hydraulic fluid may then be discharged into the accumulator 22.

The accumulator 22 may serve to receive and store the pressurized hydraulic fluid discharged from the pump 22, so that the pressure can be accumulated. As shown in FIG. 1, the accumulator 22 may be connected to the hydraulic booster 3 via the pipeline P11 and a pipeline P12, so that the pressurized hydraulic fluid may be delivered from the accumulator 22 to the hydraulic booster 3. Preferably, the accumulator 22 may be configured as a pressure-variable accumulator that may be chosen from a spring-biased accumulator or a gas-sealed accumulator.

Thus, the pressure source 2 may serve to pressurize the brake fluid stored within the reservoir tank 4 and to accumulate the pressure of the pressurized brake fluid. In this representative embodiment, the brake fluid may serve as a power transmission medium as will be hereinafter described.

Referring again to FIG. 1, as described previously, the accumulator 22 may be connected to the hydraulic booster 3 via the pipelines P11 and P12. The hydraulic booster 3 may be in turn connected to the brake pedal 10. The hydraulic booster 3 may include a hydraulic pressure control valve (not shown) that is operable to adjust the pressure of the brake fluid in response to the amount of stepping of the brake pedal 10 or a stepping force applied to the brake pedal 10, so that the brake fluid having a pressure thus adjusted may be discharged from the hydraulic booster 3. Thus, the brake fluid stored within the accumulator 22 may be delivered to the hydraulic booster 3 and the pressure of the brake fluid may then be adjusted by the hydraulic control valve. For example, the hydraulic control valve may serve to increase the pressure of the brake fluid in proportion to the amount of stepping of the brake pedal 10. The hydraulic booster 3 may serve as a hydraulic pressure control unit in this respect.

The hydraulic booster 3 may be connected to the reservoir tank 4 via pipelines P1 and P2, so that surplus brake fluid may be returned to the reservoir tank 4 or additional brake fluid may be supplied from the reservoir tank 4 to the hydraulic booster 3.

The hydraulic booster 3 also may be connected to the pressure adjusting unit 5 via pipelines P3 and P4, so that the brake fluid, the pressure of which has been adjusted by the hydraulic booster 3, may be supplied to the pressure adjusting unit 5.

The hydraulic pressure regulator unit 5 may be operable to increase, decrease, or maintain a pressure(s) that may be applied by the wheel brakes 6. In other words, braking forces applied by the wheel brakes 6 may be adjusted by the hydraulic pressure regulator unit 5. Preferably, the hydraulic pressure regulator unit 5 may operate in response to command signals outputted from the operation control unit 13, so that a brake control operation such as anti lock brake control can be performed.

Figure 4:
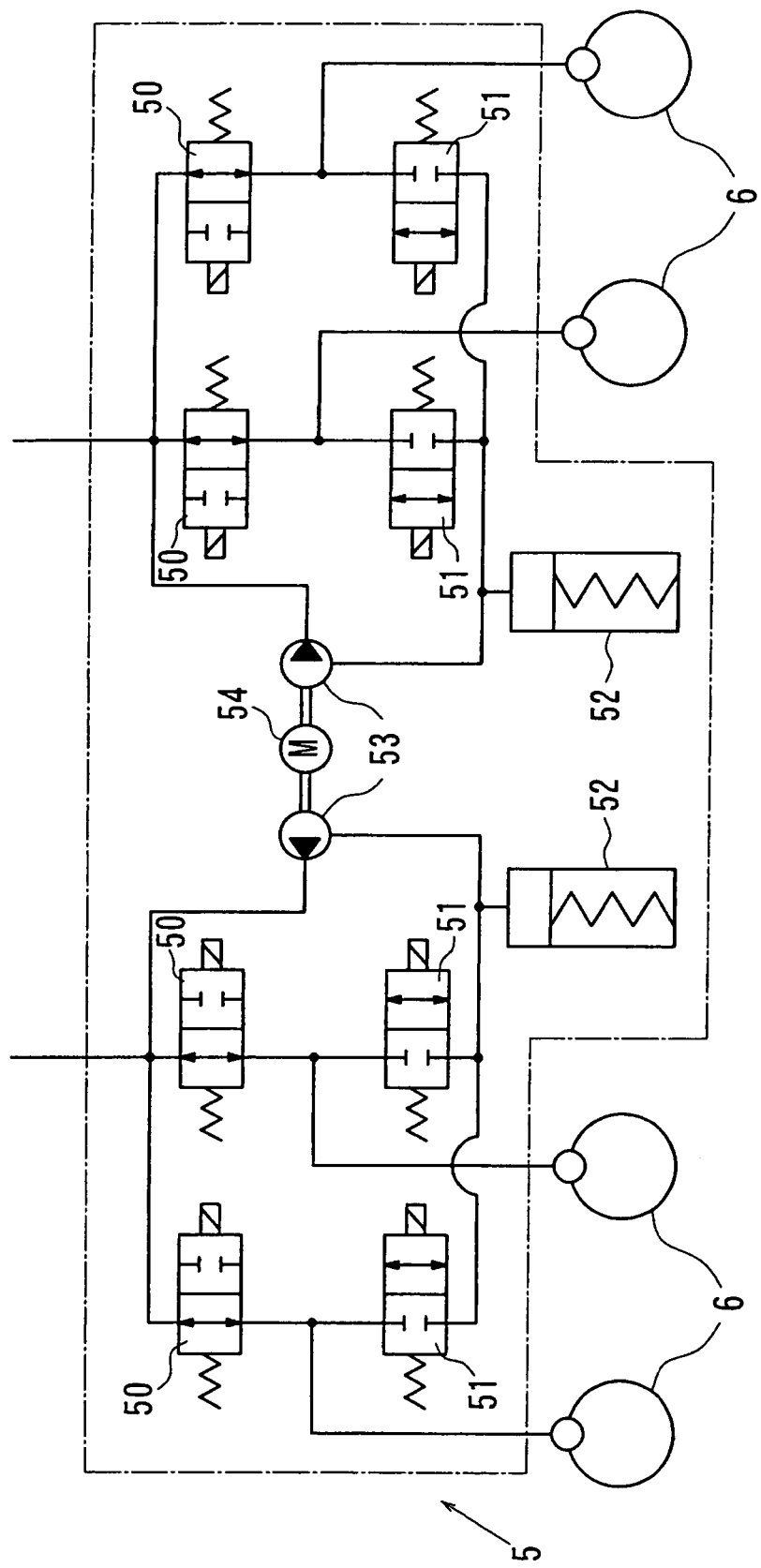
FIG. 4 is a diagram showing various elements of a pressure regulator unit and associated pipelines.

Referring to FIG. 4, the pressure regulator unit 5 may include first solenoid valves 50, second solenoid valves 51 and low pressure fluid reservoirs 52. In the embodiment shown in FIG. 4, four first solenoid valves 50, four second solenoid valves 51 and two low pressure fluid reservoirs 52 may be provided. One of the low pressure fluid reservoir 52 may be associated with the first solenoid valves 50 and the other of the low pressure fluid reservoir 52 may be associated with the second solenoid valve 51. The low pressure fluid reservoirs 52 may serve to receive the brake fluid that is discharged from the respective wheel brakes 6. The pressure regulator units 5 also may include two pumps 53 and a motor 53. The motor 53 is adapted to drive the pumps 53. The pumps 53 may serve to draw and pressurize the brake fluid stored within the respective low pressure fluid reservoirs 52. The pressurized hydraulic fluid may then be returned to the respective wheel brakes 6.

Referring to FIGS. 1 and 4, the first solenoid valves 50 may be connected to the hydraulic booster 3 and each two of the first solenoid valves 50 may be operable to open and close in order to supply or stop to supply the pressurized hydraulic fluid from the hydraulic booster 3 to the respective wheel brakes 6.

Each two of the second solenoid valves 51 may be connected to the corresponding low pressure fluid reservoir 52 and may open to discharge the brake fluid from the corresponding wheel brake 6 to the corresponding low pressure fluid reservoir 52. As a result, the pressure of the brake fluid supplied to the wheel brake(s) 6 may be reduced.

Thus, the pressure of the brake fluid that is supplied to the wheel brakes 6 may be adjusted by the operations of the first and second solenoid valves 50 and 51. Preferably, each of the wheel brakes 6 may include a wheel cylinder, a brake pad and a rotor (not shown). The rotor may be attached to each wheel (not shown). When the pressurized hydraulic fluid is supplied to each of the wheel brakes 6, the wheel cylinder may be actuated to press the brake pad against the rotor, so that a braking force may be applied to each wheel via the rotor. When the pressure of the hydraulic fluid is reduced, the braking force may be reduced. In this way, the wheel brakes 6 are actuated by the supply of the pressurized brake fluid and may serve as operation devices.

Preferably, the reservoir tank 4 and the hydraulic booster 3 may be disposed within an engine compartment (not shown) of the vehicle in a position adjacent to the brake pedal 10. The pressure regulator unit 5 may also be disposed within the engine compartment or any other suitable position. As described above, the wheel brakes 6 may be associated with respective wheels of the vehicle.

Referring to FIG. 1, the brake fluid may be supplied from the hydraulic booster 3 to the wheel brakes 6 via the pipelines P5, P6, P7 and P8. Therefore, the pipelines P5 to P8 may have a relatively long length(s). The transmission of the pressure of the brake fluid from the hydraulic booster 3 to the wheel brakes 6 may be delayed as the length(s) of the pipelines P5 to P8 becomes longer. The transmission speed of the pressure may be further reduced if the brake pedal 10 is abruptly stepped and/or if the atmospheric temperature is relatively low.

In addition, because the pressure regulator unit 5 is disposed between the hydraulic booster 3 and the wheel brakes 6, the first and second solenoid valves 50 and 51 of the pressure regulator unit 5 may provide resistance against flow of the brake fluid. Therefore, the transmission speed of the pressure may also be reduced by such resistance produced in the pressure regulator unit 5.

Furthermore, the reduction in the transmission speed of the pressure may cause differences in pressure along the flow paths of the brake fluid including pipelines P3 to P8.

Referring to again FIG. 1, the brake device 1 may further include a first pressure sensor 11 and a second pressure sensor 12.

The first pressure sensor 11 may be attached to the pipeline P3 that connects between the hydraulic booster 3 and the pressure regulator unit 5. Therefore, the first pressure sensor 11 may serve to detect the pressure of the brake fluid discharged from the hydraulic booster 3.

The second pressure sensor 12 may be attached to a juncture of the pipelines P10, P11 and P12 that connect between the pressure source 2 and the hydraulic booster 3. Therefore, the second pressure sensor 12 may serve to detect the pressure of the brake fluid accumulated within the accumulator 22.

The first and second pressure sensors 12 and 13 may be electrically connected to the operation control unit 13, so that detection signals outputted from the first and second pressure sensors 12 and 13 may be inputted to the operation control unit 13.

Based upon the detection signal from the second pressure sensor 13, the operation control unit 13 determines whether or not the accumulated pressure within the accumulator 22 is higher than a predetermined pressure. If the accumulated pressure is not higher than the predetermined pressure, the operation control unit 13 outputs signals to the motor 21 so as to start the motor 21, so that the pressure of the brake fluid accumulated within the accumulator 22 may be increased to the predetermined pressure.

The pressure regulator unit 5 also may be electrically connected to the first and second solenoid valves 50, 51 and the motor 54 so as to suitably control these elements in a known manner.

Preferably the operation control unit 13 may include a CPU that stores a program for executing the above control of the motor 21, the first and second solenoid valves 50, 51 and the motor 54. The operation control unit 13 also may store programs for executing a method of measuring the pressure of the brake fluid and a method of evaluating soundness of the brake device 1.

A representative method of measuring the pressure of the brake fluid (hereinafter called "representative measuring method") and a representative method of evaluating soundness of the brake device 1 (hereinafter called "representative evaluation method") will be hereinafter described with reference to FIG. 5.

The representative measuring method and the representative evaluation method require pressure detection signals from the first and second pressure sensors 11 and 12. The representative measuring method may be adapted to measure the pressure of the brake fluid that is delivered from the hydraulic booster 3 to the wheel brakes 6. The representative evaluation method may be adapted to evaluate the soundness of the brake device 1 in terms of non-presence of the air mixed with the brake fluid and/or no leakage of the brake fluid from the pipelines.

Figure 5:
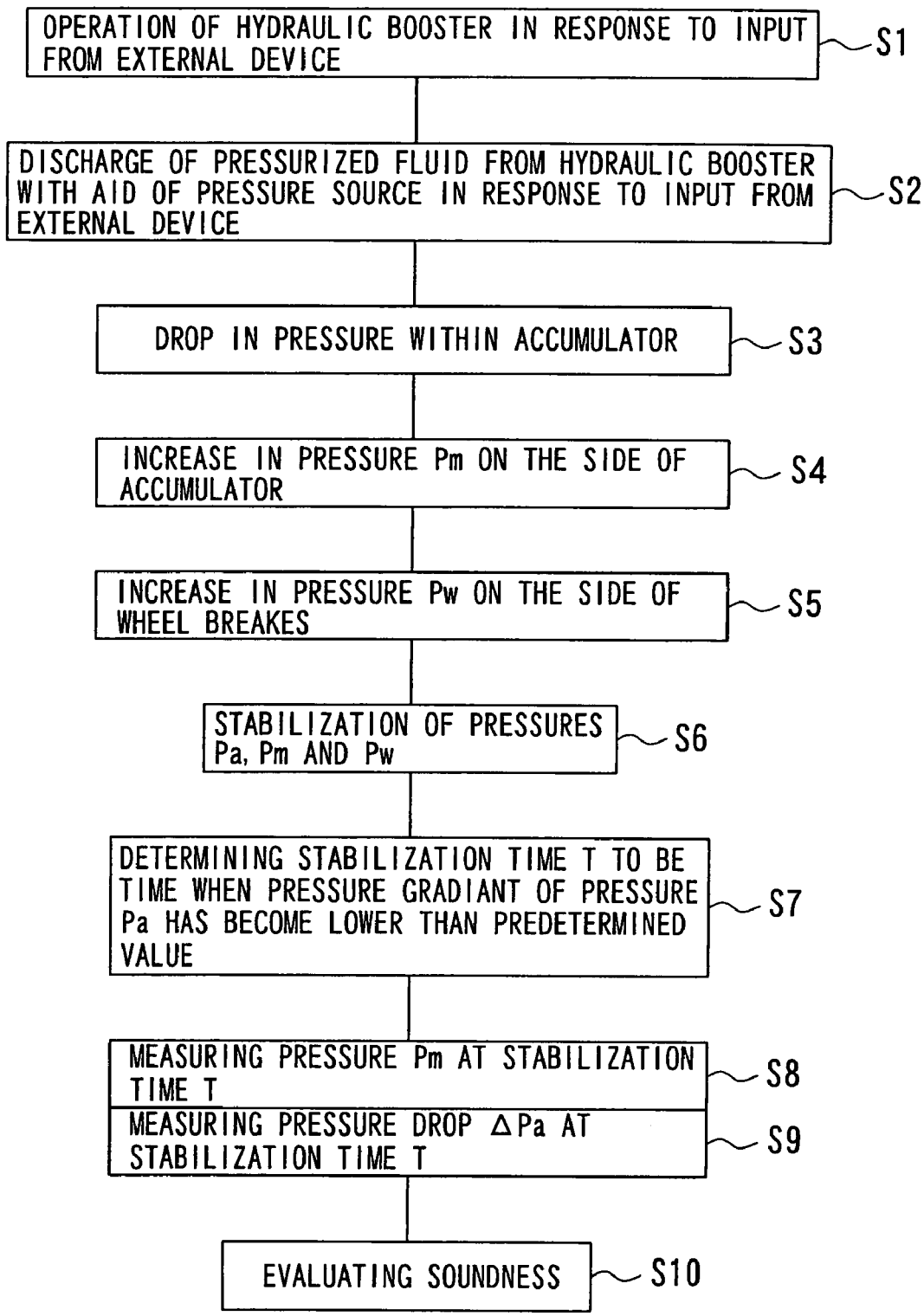
FIG. 5 is a flow chart showing steps of representative method of measuring a pressure of a brake fluid and a representative method of evaluation of soundness.

FIG. 5 shows a process including various steps. Some of the steps may be executed by the CPU of the operation control unit 13 in order to perform the representative measuring method and the representative evaluation method that may be performed in succession to the representative measuring method.

First, in Step S1, the hydraulic booster 3 may operate based upon an input from outside. For example, such an input may be an action of an operator, or a driver of the vehicle, who steps on the brake pedal 10.

Then, the booster 3 may discharge the brake fluid that is pressurized in response to the amount of operation of the brake pedal 10 or the stepping force applied to the brake pedal 10 by utilizing the pressure of the brake fluid stored within the accumulator 22 (Step S2).

Because the pressure of the brake fluid stored within the accumulator 22 is consumed in Step S2, the pressure of the brake fluid within the accumulator 22 may begin to be lowered (Step S3).

Figure 2:
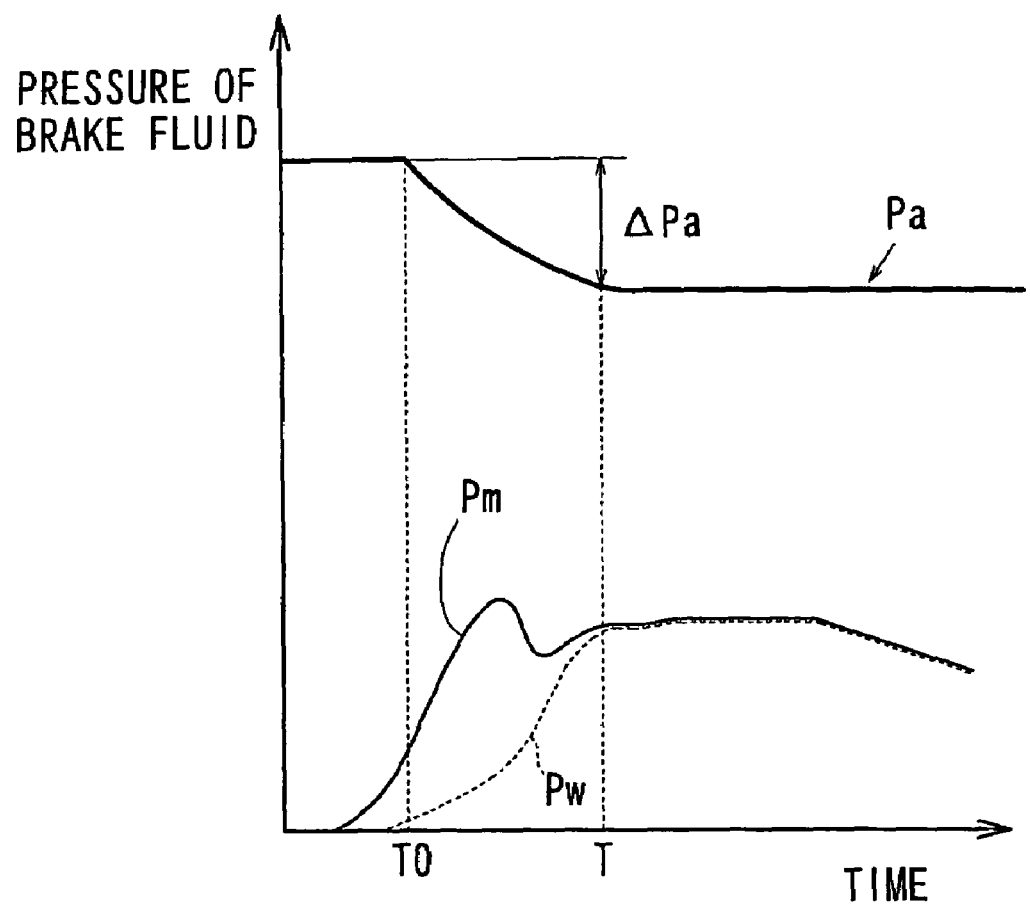
FIG. 2 is a graph showing changes of a pressure Pa measured at an accumulator, a pressure Pm measured at a portion of the pipeline that connects a hydraulic booster and wheel brakes.

For example, pressure Pa of the brake fluid stored within the accumulator 22 may vary with time as shown in FIG. 2. In FIG. 2, the origin of coordinate with regard to time is a time when the brake pedal 10 is stepped. As will be seen from FIG. 2, the pressure Pa begins to be lowered at time T0 after the brake pedal 10 has been stepped. The pressure Pa may be detected by the second pressure sensor 12.

If the amount of stepping of the brake pedal 10 is maintained to a fixed amount, the pressure Pa may become substantially uniform after the time T when a predetermined time has elapsed from the time T0. In other words, a pressure gradient per unit time may become substantially zero as will be described in connection with Step S6.

On the other hand, the pressure of the brake fluid within the pipelines P3 to P8 that connect between the hydraulic booster 3 and the wheel brakes 6 may begin to increase due to the operation of the hydraulic booster 3. As described previously, the transmission of the pressure of the brake fluid may be delayed, e.g., due to leakage of the brake fluid, to cause differences in pressure within the pipelines along the length of the pipelines.

Therefore, pressure Pm of the brake fluid discharged from the hydraulic booster 3 may vary (increase) with time as shown in FIG. 2 (Step S4). The pressure Pm may be measured by the first pressure sensor 11 as described previously. On the other hand, pressure Pw of the brake fluid on the side of the wheel brakes 6 (e.g. the pressure within the pipelines P5 to P8) may vary with time as also shown in FIG. 2.

More specifically, the pressure Pm may begin to increase when a short time has elapsed after the stepping operation of the brake pedal 10. The pressure Pm may become stable when a certain time has elapsed after that (Step S6). The pressure Pw may begin to increase short time after the increase of the pressure Pm. The pressure Pw may gradually increase until the pressure Pw becomes substantially equal to the pressure Pm. (Step S6).

The operation control unit 13 may receive detection signals from the second pressure sensor 12 and may monitor the change of the pressure Pa of the brake fluid discharged from the accumulator 22. The operation control unit 13 may determine the time T (hereinafter also called "stabilization time T") when the pressure gradient per unit time of the pressure Pa becomes less than a predetermined gradient value. For example, such a predetermined gradient may be set to 0.5 MPa/s and the stabilization time T may be chosen to be a time when the pressure gradient per unit time becomes substantially zero. As will be seen from FIG. 2, the pressure gradient per unit time of the pressure Pa may have a negative value, e.g. –0.5 MPa/s, at the stabilization time T. Therefore, the operation control unit 13 may preferably determine the stabilization time T based on an absolute value of the pressure gradient per unit time of the pressure Pa.

As shown in FIG. 2, the pressure Pm and the pressure Pw at the time T may be substantially equal to each other. In other words, the pressure within the pipelines P3 to P8 that connect between the hydraulic booster 3 and the wheel brakes 6 may be substantially uniform along the length of pipelines P3 to P8. This may indicate that the pressure within these pipelines is strongly influenced by the flow ratio of the brake fluid that is discharged from the accumulator 22. Thus, when the hydraulic booster 3 operates, the accumulated pressure within the accumulator 22 may be consumed to thereby cause change in the pressure within the pipelines P3 to P8.

The representative measuring method may utilize this relation in order to determine the pressure of the brake fluid supplied to the brake devices 6. Thus, the operation control unit 13 determines the pressure Pm at the stabilization time T (detected by the fist pressure sensor 11) to be the pressure Pw of the brake fluid that is supplied to the brake devices 6 (Step S8). In other words, the operation control unit 13 determines the pressure Pm at the stabilization time T to be a stable pressure that is supplied to the brake devices 6.

The measurement of the pressure Pa for determining the stabilization time T as well as the measurement of the pressure Pm at the stabilization time T may be performed using either an on-time method or a conversion method.

According to the on-time method, the detection signals from the second pressure sensor 12 may be periodically or continuously inputted to the operation control unit 13, so that the pressure gradient of the pressure Pa may be calculated based on the detection signals during the detection process. The stabilization time T may be determined when the calculated pressure gradient reaches the predetermined value. When the stabilization time T has reached, the pressure Pm at the stabilization time T may be determined based on the detection signals from the first pressure sensor 11.

On the other hand, according to the conversion method, the operation control unit 13 may periodically or continuously perform to temporarily store the detection signals from the first and second pressure sensors 11 and 12 in a memory (not shown). The operation control unit 13 may then calculate the pressure gradient of the pressure Pa from the stored detection signals and may determine when the stabilization time T has reached. When the stabilization time T has reached, the pressure Pm at the stabilization time T may be determined based on the detection signals from the first pressure sensor 11.

The representative evaluation method may be performed in succession to Step S8 and will now be described.

First, the operation control unit 13 may calculate the difference between the pressure Pa at the stabilization time T and the pressure Pa at the time T0 before the pressure Pa begins to change. Thus, pressure drop ΔPa as indicated in FIG. 2 may be calculated (Step S9).

The calculation of the pressure drop ΔPa may be made from the pressure Pa that is determined according to either the on-time method or the conversion method in the same manner as described in connection with the pressure Pm. Thus, according to the on-time method, the detection signals from the second pressure sensor 12 may be periodically or continuously inputted to the operation control unit 13. The inputted detection signals may then be used to calculate the pressure drop ΔPa. On the other hand, according to the conversion method, the operation control unit 13 may periodically perform to temporarily store the detection signals from the second pressure sensor 12 in the memory. The operation control unit 13 may then calculate the pressure drop ΔPa from the stored detection signals.

As described previously, the time T0 is a time when the pressure Pa begins to change, i.e., before the hydraulic booster 3 is operated.

The operation control unit 13 may then evaluate the soundness of the brake device 1 based on the pressure Pm at the stabilization time T and the pressure drop ΔPa (Step S10).

The relation between the pressure Pm at the stabilization time T and the pressure drop ΔPa will now be explained.

The pressure Pa of the brake fluid discharged from the accumulator 22 may be lowered when the brake fluid is discharged from the accumulator 22 in response to the operation of the hydraulic booster 3. The quantity (or flow rate) of the brake fluid discharged from the accumulator 22, i.e., the quantity (or flow rate) of the brake fluid supplied from the accumulator 22 to the hydraulic booster 3 may have a close relationship with the pressure drop ΔPa of the pressure Pa. The quantity (or flow rate) of the brake fluid discharged from the accumulator 22 will be hereinafter called "quantity Qa."

Figure 3:
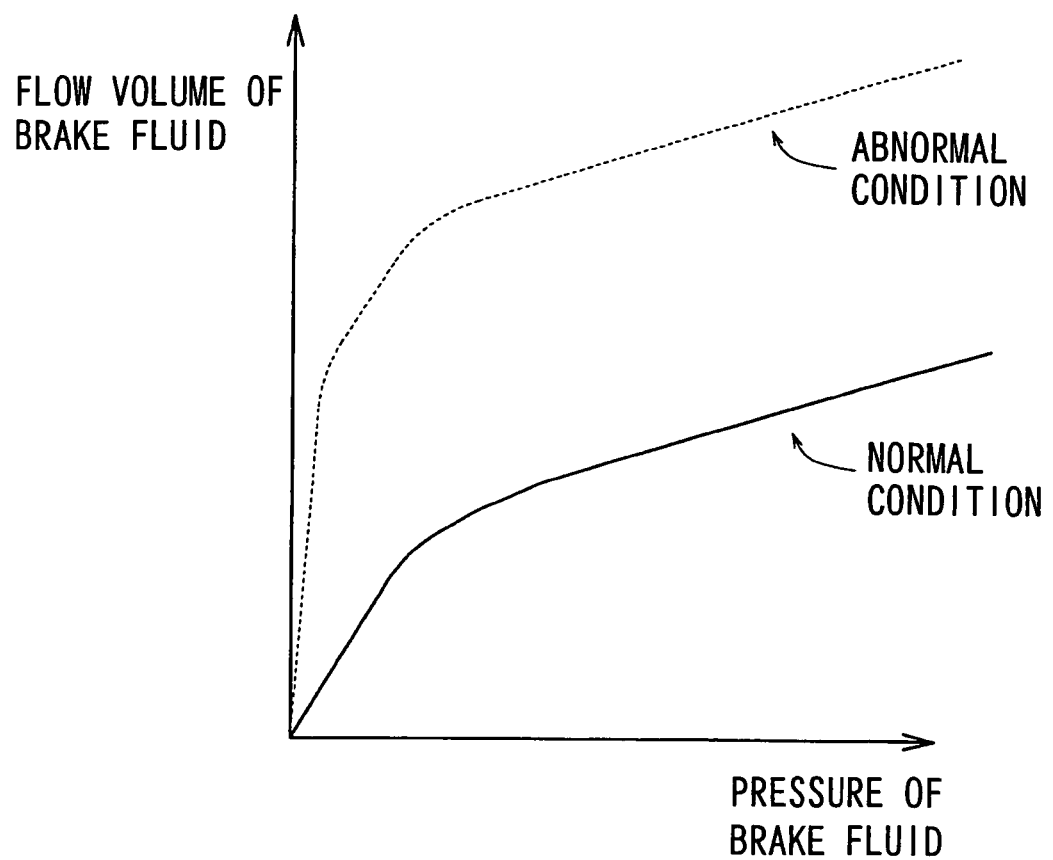
FIG. 3 is a graph showing the relationship between the pressure Pw and a flow rate of a brake fluid.

In addition, in order to control the pressure Pw (the pressure supplied to the wheel brakes 6) to a value that corresponds to the input, i.e., the stepping amount of the brake pedal 10), the hydraulic booster 3 may discharge a necessary quantity (or flow rate) Qw of the brake fluid to the wheel brakes 6, while the brake fluid supplied from the accumulator 22 may be utilized by the hydraulic booster 3. Therefore, the quantity Qa of the brake fluid supplied from the accumulator 22 may be the same as the quantity Qw of the brake fluid supplied to the wheel brakes 6 (Qa=Qw). Further, the quantity Qw has a close relationship with the pressure Pw as indicated by a solid line in FIG. 3. The pressure Pw in FIG. 3 is measured after the pressure within the pipelines between the hydraulic booster 3 and the wheel brakes 6 has been stabilized or has become steady. In this way, the pressure drop ΔPa has a close relationship with the pressure Pm.

However, when air has entered the pipelines (i.e., pipelines that are connected to the wheel brakes 6) and has been mixed with the brake fluid, or when the brake fluid has leaked from the pipelines, the relationship between the quantity Qw and the pressure Pw as indicated by the solid line in FIG. 3 may no longer be maintained. Thus, in such an abnormal condition, the quantity Qw may be increased in order to provide the same pressure Pw as in a normal condition. Therefore, the quantity Qw may have a relationship with the pressure Pw as indicated by a dotted line in FIG. 3.

In order to increase the quantity Qw, the quantity Qa of the brake fluid supplied from the accumulator 22 requires to be increased. If the quantity Qa is increased, the pressure drop ΔPa may be increased. Thus, under the abnormal condition, in order to provide the required pressure Pw, the quantity Qw as well as the quantity Qa must be increased, so that the magnitude of the pressure drop ΔPa may be increased than the magnitude under the normal condition.

According to the representative evaluation method, the operation control unit 13 may first obtain the pressure Pm at the time T when the pressure Pm becomes substantially equal to the pressure Pw. Then, the operation control unit 13 may determine that the pressure Pm is equal to the pressure Pw. At the same time, the operation control unit 13 may calculate the pressure drop ΔPa. Preferably, the operation control unit 13 may stores a map prepared based on experimental results of the relationship between the pressure Pm or Pw at the time T and the pressure drop ΔPa under a normal condition. The operation control unit 13 may thereafter compare the calculated pressure drop ΔPa with the pressure drop ΔPa given by the map.

For example, if the calculated pressure drop ΔPa (for providing a predetermined value of the pressure Pw) is greater than the pressure drop ΔPa under the normal condition given by the map, the operation control unit 13 may determine that the brake device 1 is unsoundness.

As a result, the soundness of the brake device 1 can be evaluated (Step S10). In other words, the operation control unit 13 may determine if the air has mixed with the brake fluid or if the brake fluid has leaked from the pipelines.

In order to improve the accuracy of the representative measuring method and the evaluation method, these methods may preferably be carried out when the pump 20 is not driven or operated.

Thus, when the pump 20 is driven or operated, the pressure gradient per unit time of the brake fluid discharged from the accumulator 22 may occasionally approach to zero due to the supply of the brake fluid from the pump 20. Therefore, the operation control unit 13 may determine the time T to be the time when this occurs, even if the pressure of the fluid within the pipelines has not yet become stable. As a result, the accuracy of the measurement method and the evaluation method may be ensured if the methods are performed when the pump 20 is not driven.

Preferably, the operation control unit 13 may determine whether or not the pump 20 is driven. To this end, the operation control unit 13 may receive signals from the motor 21 when the power is supplied to the motor 21. Otherwise, the operation control unit 13 may receive signals from a suitable sensor (not shown) that detects the operating condition of the motor 21 or the pump 20.

In addition to the determination whether or not the pump 20 is driven or as a substitution for this determination, the operation control unit 13 may control the motor 21 or the pump 20 such that the pump 20 may not be driven during the measurement and/or the evaluation. This measure also may prevent the inaccurate determination of the stabilization time T and may improve the accuracy of the measurement and/or the evaluation. Furthermore, because the measurement and/or the evaluation can be performed in preference to the operation of the pump 20 by controlling the operation of the pump 20 or the motor 21, the frequency of the measurement and/or the evaluation can be increased.

The pressure measured by the representative method (the pressure of the brake fluid discharged from the hydraulic booster 3) may be used for providing multifunctional brake devices and for providing a more precise control of brake devices.

A warning light or an alert buzzer may be connected to the operation control unit 13, so that the result of evaluation of the soundness may be outputted as a light signal or an audible signal. If the brake device is under the unsoundness condition, the braking force may be reduced in some cases due to loss in stroke of the brake pedal 10. The representative brake device 1 is advantageous because the evaluation can be automatically performed.

As described above, according to the representative measuring method, the stabilization time T may be determined based on the change in pressure of the brake fluid discharged from the accumulator 22. In other words, the time of measuring the pressure is determined based on the change in pressure of the brake fluid. Therefore, even on the condition that the pressure within the pipelines between the hydraulic booster 3 and the wheel brakes 6 is unstable due to the delay of transmission of pressure, the pressure of the brake fluid at the wheel brakes 6 or the pressure of the brake fluid within the pipelines between the hydraulic booster 3 and the wheel brakes 6 can be accurately and rapidly measured after the pressure has become in stable.

In addition, because the pressure of the brake fluid at the wheel brakes 6 can be accurately and rapidly measured, the accuracy of the evaluation of the soundness can be improved and the evaluation can be rapidly performed.

As described previously, the hydraulic booster 3 may serve to supply the pressurized brake fluid to the pressure regulator unit 5 (see FIG. 1). The flow of the pressurized brake fluid may be divided at the pressure regulator unit 5 and may then be delivered to the respective wheel brakes 6. The representative brake device 1 may be arranged, such that the first pressure sensor 11 may be attached to the pipeline P3 that connects between the hydraulic booster 3 and the pressure regulator unit 5. Therefore, the number of necessary pressure sensors can be minimized in comparison with an arrangement, in which a pressure sensor is mounted on each of the pipelines P5 to P8 that are disposed between the hydraulic booster 5 and the wheel brakes 6. In addition, the number of electrical lines that connect between the pressure sensor(s) and the operation control unit 13 can be minimized.

Although the present invention has been described in connection with the above representative brake device and the representative measuring and evaluation methods that are used for the representative brake device, the present invention also may be applied to any other type of brake devices or hydraulic drive devices as will be hereinafter described.

(1) Although the representative brake device includes the hydraulic booster 3, the hydraulic booster 3 may be replaced with a fluid-pressure control valve (not shown). The control valve may be operable to open and close in response to the input from an external device, i.e., a brake pedal, so that the brake fluid having the controlled pressure may be supplied to the wheel brakes 6. Brake devices incorporating such control valves are known as full-power type brake devices.

(2) The representative brake device may include an automatic brake mechanism (not shown). In such a design, the hydraulic booster 3 may be replaced with a fluid-pressure control valve (solenoid valve) (not shown) that can open and close in response to control signals. Therefore, the fluid may be supplied from the accumulator 22 (or any other known high pressure generator, e.g. a pressure generator of a type known as "variable fluid-pressure type"), to the wheel brakes 5 via the control valve.

(3) The representative brake device 1 may be configured as a brake-by-wire type brake device, in which the brake pedal 10 may be physically separated from the wheel brakes 6. A sensor (not shown) may detect the stepping operation of the brake pedal 10 and may output signals in response to the amount of stepping of the brake pedal. A controller (not shown) similar to the operation control unit 13 may receive the signals from the sensor and may output control signals to a fluid pressure control valve similar to the fluid pressure control valve as noted in paragraph (1). In addition, the fluid may be supplied from a high pressure generator, e.g. a pressure generator of a type known as "variable fluid-pressure type", to the wheel brakes 6 via the control valve. The representative measuring and evaluation methods can be advantageously used for this kind of brake-by-wire type brake devices, because such brake devices require highly accurate measurement of the pressure of the brake fluid. In particular, it is nearly impossible to expect that a driver of a vehicle incorporating a brake-by-wire type brake device can realize the entrance of air into the brake fluid based on the change in his or her operation feeling of the brake pedal. Therefore, the representative measuring and evaluating methods can be advantageously used for the brake-by-wire type brake device, because the detection of pressure for measurement and evaluation can be automatically performed.

(4) The present invention may be applied to any other hydraulic devices or systems, such as power steering systems in addition to the brake devices.

Furthermore, the representative measuring and evaluation methods may be modified in various ways as in the followings.

(5) Although the fist pressure sensor 11 of the representative methods is adapted to detect the pressure of the brake fluid within the pipeline P3 that connects the hydraulic booster 3 and the pressure regulator unit 5, the first pressure sensor 11 may be designed to detect the pressure within any of the position along the pipelines between the hydraulic booster 3 and the pressure regulator unit 5 as long as the pressure sensor 11 can detect the pressure at the wheel brakes 6 or the pressure that represents the pressure at the wheel brakes 6. For example, the pressure sensor 11 may be disposed at any position along the pipelines that connect the hydraulic booster 3 and the wheel brakes 6. Also in this case, the operation control unit 13 may determine the stabilization time T when the change in pressure Pa has been stabilized or when the pressure has become substantially uniform. Then, the pressure of the brake fluid may be measured by the pressure sensor 11 at the stabilization time T or immediately after the stabilization time T. Therefore, the pressure of the fluid discharged from the hydraulic booster 3 can be accurately and rapidly measured or determined even if the pressure within the pipelines has been varied along the length of the pipelines due to the delay of transmission of pressure.

(6) Furthermore, the representative methods have been described to measure the pressure of the fluid discharged from the hydraulic booster 3, on the assumption that the pressure of the brake fluid within the pipelines between the hydraulic booster 3 and the wheel brakes becomes uniform after the stabilization time T. However, if the distribution of the pressure of the brake fluid along the pipelines can be previously determined by the experimental results or calculations, the pressure of the fluid discharged from the hydraulic booster 3 can be determined by an appropriate calculation based on the pressure Pa, e.g., by multiplying the measured value of the pressure Pa by a an appropriate correction coefficient. Naturally, the pressure obtained by such calculation may be used for the evaluation method.

What is claimed is:

1. A method of evaluating soundness of a hydraulic drive device, wherein the hydraulic drive device comprises a pressure generator for generating a flow of a pressurized hydraulic fluid, a pressure-variable accumulator for accumulating the pressure of the pressurized hydraulic fluid supplied from the pressure generator, and a pressure control unit that is arranged and constructed to receive the pressurized hydraulic fluid from the accumulator and to control the pressure of the pressurized hydraulic fluid in response to an input from an external device, so that the pressurized hydraulic fluid having the controlled pressure is used for driving an operation device, comprising:

detecting a first pressure of the hydraulic fluid within a flow path of the hydraulic fluid by a first pressure sensor, wherein the flow path extends between the pressure control unit and the operation device, and the first pressure sensor is coupled to the flow path, detecting a second pressure of the hydraulic fluid discharged from the accumulator by a second pressure sensor, wherein the second pressure sensor is coupled to the accumulator, determining a stabilization time by an operation control unit, wherein the stabilization time is a time when an absolute value of a pressure gradient per unit time of the pressurized hydraulic fluid supplied from the accumulator becomes smaller than a predetermined value during the supply of the hydraulic fluid from the pressure control unit to the operation device, and the operation control unit receives detection signals from the first and second pressure sensors, determining a pressure drop of the second pressure during a period between a time prior to starting the operation of the pressure control unit and the stabilization time, determining the first pressure at the stabilization time or at a time immediately after the stabilization time, and comparing the determined pressure drop with a pressure drop under a normal condition and comparing the detected first pressure at the stabilization time with a value under normal condition of the first pressure at stabilization time or at a time immediately after the stabilization time.

2. A method as in claim 1, wherein the evaluation is performed when the pressure generator is not operated.

3. A method as in claim 1, further including resting the pressure generator in a non-operative state during the evaluation.

4. A method of evaluating a condition of a hydraulic fluid supplied from a hydraulic drive device to an operation device, wherein the hydraulic drive device comprises a pressure generator arranged and constructed to pressurize the hydraulic fluid, an accumulator arranged and constructed to receive the supply of the pressurized hydraulic fluid from the pressure generator in order to accumulate the pressure of the pressurized hydraulic fluid, and a pressure control unit arranged and constructed to receive the pressurized hydraulic fluid from the accumulator and to control the pressure of the hydraulic fluid to be supplied to the operation device in response to operation of an external device, comprising:

measuring a pressure (Pa) of the hydraulic fluid within a flow path connecting the accumulator and the pressure control unit, determining a stabilization time (T) that is the time when an absolute value of a pressure gradient per unit time of the pressure (Pa) becomes smaller than a predetermined value, determining a pressure drop (ΔPa) of the pressure (Pa) during a period between a time (T0) when the pressure (Pa) begins to decrease and the stabilization time (T) or during a period between at a time before the time (T0) and the stabilization time (T), comparing the determined pressure drop (ΔPa) of the pressure (Pa) with a predetermined pressure drop obtainable under a normal condition;

measuring a control pressure (Pm) of the hydraulic fluid within a flow path connecting the pressure control unit and the operation device, and comparing the measured control pressure (Pm) at the stabilization time or at a time immediately after the stabilization time (T) with a predetermined control pressure value obtainable under a normal condition at that time.

5. A method as in claim 4, further including determining a pressure (Pw) supplied to the operation device to be substantially equal to the pressure (Pm) measured at the stabilization time (T) or at a time immediately after the stabilization time (T).

6. A method as in claim 4, wherein the step of determining the pressure (Pw) comprises calculating the pressure (Pw) by multiplying the pressure (Pm) measured at the stabilization time (T) or at a time immediately after the stabilization time by a predetermined correction coefficient.

7. A method as in claim 4, wherein the pressure (Pa) is measured continuously or periodically, so that the pressure gradient is calculated from the measured values of the pressure (Pa).

8. A method as in claim 4, further including temporally storing the measured values of the pressure (Pa) in an operation control unit, so that the measured values stored in the operation control unit are used for calculation of the pressure gradient.

9. A method as in claim 4, wherein the determination of the pressure (Pw) of the hydraulic fluid supplied to the operation device is performed when the pressure generator is not operated.

10. A method as in claim 4, further including resting the pressure generator in a non-operative state during the determination of the pressure (Pw) of the hydraulic fluid that is supplied to the operation device.

11. A method as in claim 4, wherein the hydraulic drive device comprises a brake device, and the operation device comprises a plurality of wheel brakes.

12. A method as in claim 11, wherein the external device comprise a brake pedal.

13. A hydraulic drive device for carrying out a method of claim 4 comprising:
   the pressure generator, the accumulator and the pressure control unit,
   a first pressure sensor arranged and constructed to detect the pressure (Pa),
   an operation control unit arranged and constructed to determine the stabilization time (T) and the pressure drop ($\Delta Pa$) and to compare the determined pressure drop ($\Delta Pa$) with the predetermined pressure drop;
   a second pressure sensor arranged and constructed to detect a pressure (Pm) of the hydraulic fluid within a flow path connecting the pressure control unit and the operation device,
   wherein the operation control unit is further arranged and constructed to compare the measured pressure (Pm) at the stabilization time (T) or at a time immediately after the stabilization time (T) with a predetermined value of the pressure (Pm) to be obtained under a normal condition at that time.

* * * * *